United States Patent (10) Patent No.: US 11,843,332 B2
Nomura et al. (45) Date of Patent: Dec. 12, 2023

(54) CONTROL DEVICE AND CONTROL METHOD FOR ELECTRIC MOTOR

(71) Applicant: KABUSHIKI KAISHA TOYOTA JIDOSHOKKI, Kariya (JP)

(72) Inventors: Keigo Nomura, Aichi-ken (JP); Daisuke Matsuoka, Aichi-ken (JP); Masamichi Nawa, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/798,615

(22) PCT Filed: Jan. 22, 2021

(86) PCT No.: PCT/JP2021/002194
§ 371 (c)(1),
(2) Date: Aug. 10, 2022

(87) PCT Pub. No.: WO2021/166550
PCT Pub. Date: Aug. 26, 2021

(65) Prior Publication Data
US 2023/0088673 A1 Mar. 23, 2023

(30) Foreign Application Priority Data

Feb. 21, 2020 (JP) ................. 2020-027936

(51) Int. Cl.
*H02P 21/16* (2016.01)
*H02P 21/06* (2016.01)
(52) U.S. Cl.
CPC ................... *H02P 21/06* (2013.01)
(58) Field of Classification Search
CPC ... H02P 21/16; H02P 1/26; H02P 1/42; H02K 1/223; H02K 27/10

(Continued)

(56) References Cited

U.S. PATENT DOCUMENTS 10,890,905 B1\* 1/2021 Sepe, Jr. ................. B64D 31/00
2013/0175970 A1\* 7/2013 Tazawa ............... H02P 21/0003
318/702
2015/0198935 A1\* 7/2015 Kaku ........................ H02P 7/06
318/561

FOREIGN PATENT DOCUMENTS

JP 2003-070280 A 3/2003

OTHER PUBLICATIONS

Takagi et al. (JP 2005229717 A) Current Sensorless-Control Method and Device of Synchronous Motor Date Published Aug. 25, 2005 (Year: 2005).\*

(Continued)

Primary Examiner — Jorge L Carrasquillo
(74) Attorney, Agent, or Firm — Sughrue Mion, PLLC

(57) ABSTRACT

A control device for an electric motor includes a control circuit that controls an operation of an inverter circuit on the basis of a voltage command value corresponding to a difference between a current command value calculated on the basis of the position of a rotor of the electric motor, and a current flowing through the electric motor. A current estimation unit estimates the current flowing through the electric motor by substituting the voltage command value, a parameter unique to the electric motor, and a rotational speed calculated on the basis of the position of the rotor into a voltage equation serving as a model of the electric motor. An LR estimation unit estimates an inductance and a resistance of the electric motor serving as parameters on the basis of the difference between the current obtained by a current acquisition unit and the current estimated by the current estimation unit.

8 Claims, 4 Drawing Sheets

(58) Field of Classification Search
USPC .......................................................... 318/727
See application file for complete search history.

(56) References Cited

OTHER PUBLICATIONS

Tozu et al. (JP 2019080366 A), "Motor Control Device" Date Published May 23, 2019 (Year: 2019).*
Matsui et al. (JP 2003070280 A) "Motor Controller" Date Published Mar. 7, 2003 (Year: 2003).*

\* cited by examiner

CONTROL DEVICE AND CONTROL METHOD FOR ELECTRIC MOTOR

CROSS REFERENCE TO RELATED APPLICATION

This application is a National Stage of International Application No. PCT/JP2021/002194 filed on Jan. 22, 2021, claiming priority based on Japanese Patent Application No. 2020-027936 filed on Feb. 21, 2020, the contents of all of which are incorporated herein by reference in their entirety.

TECHNICAL FIELD

The present disclosure relates to a control device and a control method for an electric motor.

BACKGROUND ART

Patent Literature 1 discloses a motor control device including an adjustment device and an adjustment method for adjusting a current control gain of a current control system when an inverter or the like drives a synchronous motor. In the motor control device, automatic adjustment of a proportional gain and an integration gain in a control system to which PI control is applied is improved.

The motor control device includes a proportional gain table in which a proportional gain corresponding to a d-axis current command value and a q-axis current command value is preset as a table, and a gain adjustment means for searching a setting value of the proportional gain in PI control using the proportional gain table at a time of a current control gain setting to which PI control is applied.

The motor control device includes a winding temperature detection means for detecting a winding temperature of the synchronous motor, and an integration gain table in which an integration gain corresponding to the winding temperature is preset as a table. The gain adjustment means searches a setting value of the integration gain in PI control using the integration gain table at a time of a current control gain setting to which PI control is applied.

CITATION LIST

Patent Literature

Patent Literature 1: Japanese Patent Application Publication No. 2003-70280

SUMMARY OF INVENTION

Technical Problem

However, the proportional gain fluctuates depending on a current, and the integration gain fluctuates depending on a temperature. Therefore, in the motor control device of PTL 1, there is a problem that a plurality of proportional gain tables considering the fluctuation depending on the current and a plurality of integration gain tables considering the fluctuation depending on the temperature need to be created and prepared for each of different control targets (for example, for a motor and an inverter, individually).

The proportional gain table and the integration gain table are merely tables corresponding to the current and the temperature, respectively, and do not exactly correspond to an inductance (L) and a resistance (R). Thus, there is a limit to an accuracy improvement of a current control.

The present disclosure has been made in view of the above problems, and its objective is to provide a control device and a control method for an electric motor capable of achieving a simple and suitable current control.

Solution to Problem

A control device for an electric motor according to an embodiment includes: an inverter circuit that drives a rotor of the electric motor; a current acquisition unit configured to acquire a current flowing through the electric motor; and a control circuit that controls an operation of the inverter circuit on a basis of a voltage command value corresponding to a difference between a current command value calculated on the basis of a position of the rotor of the electric motor and the current flowing through the electric motor. The control circuit includes: a current estimation unit configured to estimate the current flowing through the electric motor by substituting the voltage command value, a parameter unique to the electric motor, and a rotational speed calculated on the basis of the position of the rotor of the electric motor into a voltage equation as a model of the electric motor; an LR estimation unit configured to estimate an inductance and a resistance of the electric motor on the basis of a difference between the current acquired by the current acquisition unit and an estimated current by the current estimation unit, each of the inductance and the resistance of the electric motor corresponding to the parameter; and a gain determination unit configured to determine a proportional gain for a current control on the basis of an estimated inductance of the electric motor and determine an integration gain for the current control on the basis of an estimated resistance of the electric motor.

A control method for an electric motor according to an embodiment, the electric motor including: an inverter circuit that drives a rotor of the electric motor; a current acquisition unit configured to acquire a current flowing through the electric motor; and a control circuit that controls an operation of the inverter circuit on a basis of a voltage command value corresponding to a difference between a current command value calculated on the basis of a position of the rotor of the electric motor and the current flowing through the electric motor. In the control method, the control circuit executes: a current estimation step in which the current flowing through the electric motor is estimated by substituting the voltage command value, a parameter unique to the electric motor, and a rotational speed calculated on the basis of the position of the rotor of the electric motor into a voltage equation as a model of the electric motor; an LR estimation step in which an inductance and a resistance of the electric motor are estimated on the basis of the current acquired by the current acquisition unit and an estimated current by the current estimation step, each of the inductance and the resistance corresponding to the parameter; and a gain determination step in which a proportional gain for a current control is determined on the basis of an estimated inductance of the electric motor, and an integration gain for the current control is determined on the basis of an estimated resistance of the electric motor.

As a result, a simple and suitable current control is achieved since the inductance and the resistance of the electric motor are estimated using the voltage equation as the model of the electric motor, the proportional gain for the current control is determined on the basis of the estimated inductance of the electric motor, and the integration gain for the current control is determined on the basis of the estimated resistance of the electric motor.

The LR estimation unit (in the LR estimation step) may estimate the inductance and the resistance of the electric motor using a recursive least squares method or a weighted least squares method.

As a result, the inductance and the resistance of the electric motor are estimated with high accuracy using the recursive least squares method or the weighted least squares method.

The control circuit may include a determination unit configured to determine that the estimated current by the current estimation unit is incorrect when a difference between the current acquired by the current acquisition unit and the estimated current by the current estimation step is equal to or greater than a threshold. Alternatively, the control circuit may include a determination step in which the estimated current by the current estimation step is incorrect when a difference between the current acquired in the current acquisition step and the estimated current by the current estimation step is equal to or greater than a threshold.

As a result, the use of an incorrect estimated current is prevented, which can previously prevent an error in estimation of the inductances and the resistance of the electric motor and an error in determination of the proportional gain and the integration gain.

When the determination unit determines that the estimated current by the current estimation unit is incorrect, the LR estimation unit may stop estimations of the inductance and the resistance, and the gain determination unit may stop determinations of the proportional gain and the integration gain based on the estimated inductance and the estimated resistance. Alternatively, in the determination step, when the estimated current by the current estimation step is determined to be incorrect, estimations of the inductance and the resistance may be stopped in the LR estimation step, and determinations of the proportional gain and the integration gain based on the estimated inductance and the estimated resistance may be stopped in the gain determination step.

As a result, estimation of an incorrect (low reliability) inductance and an incorrect (low reliability) resistance based on an incorrect (low reliability) estimated current and determination of an incorrect (low reliability) proportional gain and an incorrect (low reliability) integration gain can be certainly prevented.

Advantageous Effects of Invention

According to the present disclosure, a control device and a control method for an electric motor capable of achieving a simple and suitable current control are provided.

DESCRIPTION OF EMBODIMENTS

Hereinafter, an embodiment will be described in detail with reference to the drawings.

Figure 1:
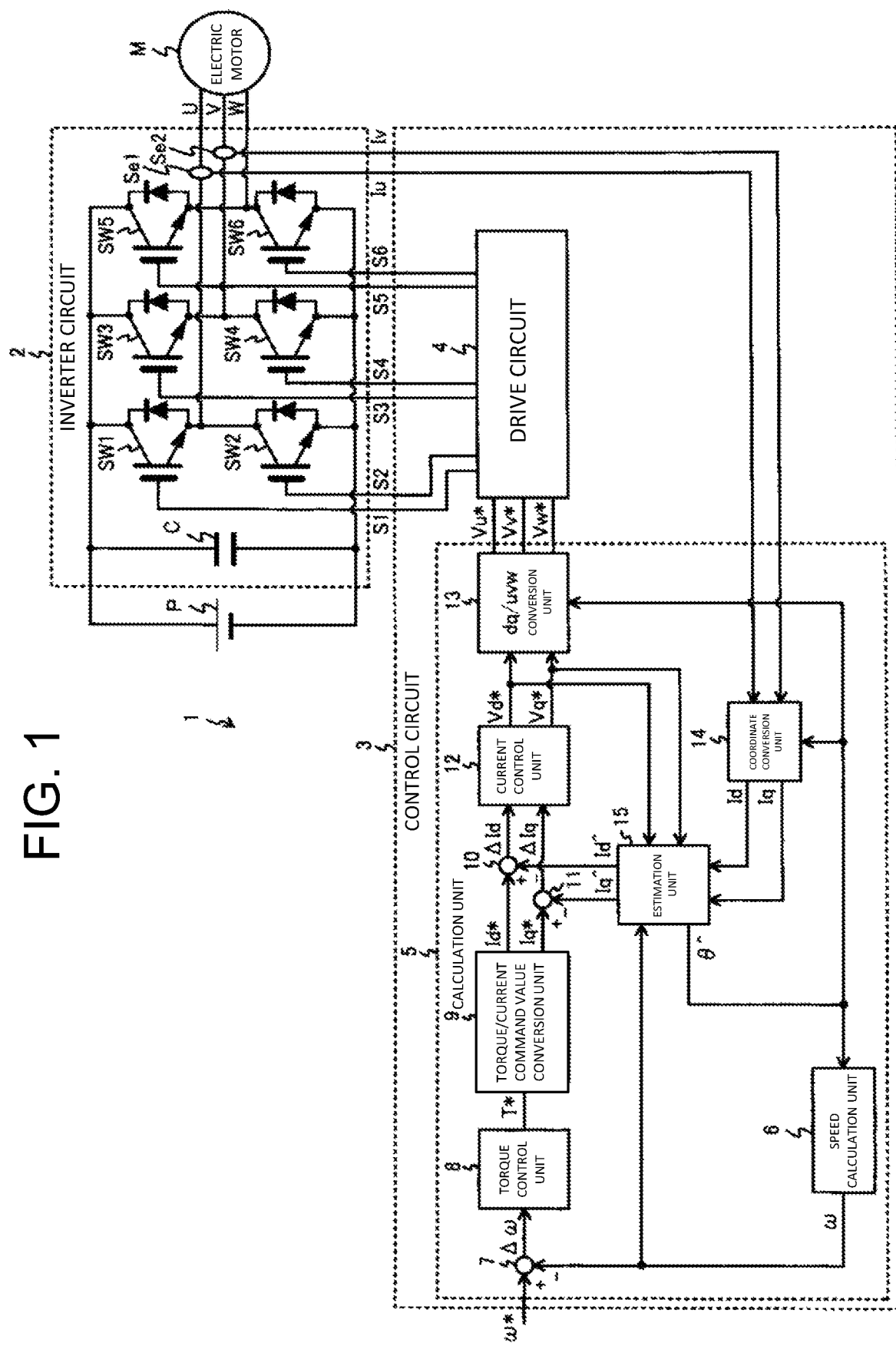
FIG. 1 is a diagram illustrating an example of a control device for an electric motor of an embodiment.

FIG. 1 is a diagram illustrating an example of a control device for an electric motor according to an embodiment. For example, an IPMSM (Interior Permanent Magnet Synchronous Motor) as a PM (Permanent Magnet) motor may be used as the electric motor.

A control device 1 illustrated in FIG. 1 controls the driving of an electric motor M mounted on a vehicle such as an electric forklift truck or a plug-in hybrid vehicle, and includes an inverter circuit 2 and a control circuit 3.

The inverter circuit 2 drives a rotor of the electric motor M by power supplied from a direct-current power supply P, and includes a capacitor C, switching elements SW1 to SW6 (for example, IGBTs (Insulated Gate Bipolar Transistors)), and current sensors Se1 and Se2. More specifically, one end of the capacitor C is connected to a positive electrode terminal of the direct-current power supply P and a collector terminal of each of the switching elements SW1, SW3, and SW5, and the other end of the capacitor C is connected to a negative electrode terminal of the direct-current power supply P and an emitter terminal of each of the switching elements SW2, SW4, and SW6. A connection point between an emitter terminal of the switching element SW1 and a collector terminal of the switching element SW2 is connected to a U-phase input terminal of the electric motor M via the current sensor Se1. A connection point between an emitter terminal of the switching element SW3 and a collector terminal of the switching element SW4 is connected to a V-phase input terminal of the electric motor M via the current sensor Se2. A connection point between an emitter terminal of the switching element SW5 and a collector terminal of the switching element SW6 is connected to a W-phase input terminal of the electric motor M.

The capacitor C smooths a voltage that is output from the direct-current power supply P and input to the inverter circuit 2.

The switching element SW1 is turned on or off on the basis of a drive signal S1 output from the control circuit 3. The switching element SW2 is turned on or off on the basis of a drive signal S2 output from the control circuit 3. The switching element SW3 is turned on or off on the basis of a drive signal S3 output from the control circuit 3. The switching element SW4 is turned on or off on the basis of a drive signal S4 output from the control circuit 3. The switching element SW5 is turned on or off on the basis of a drive signal S5 output from the control circuit 3. The switching element SW6 is turned on or off on the basis of a drive signal S6 output from the control circuit 3. By turning each of the switching elements SW1 to SW6 on or off, the direct current output from the direct-current power supply P is converted to three alternating current powers whose phases are different from each other by 120 degrees, and the alternating current powers are input to the U-phase input terminal, the V-phase input terminal, and the W-phase input terminal of the electric motor M, so that the rotor of the electric motor M rotates.

The current sensor Se1 including a Hall element, a shunt resistor, and the like detects a U-phase current Iu flowing through a U-phase of the electric motor M to output the U-phase current Iu to the control circuit 3. The current sensor Se2 including a Hall element, a shunt resistor, and the like detects a V-phase current Iv flowing through a V-phase of the electric motor M to output the V-phase current Iv to the control circuit 3.

The control circuit 3 includes a drive circuit 4 and a calculation unit 5.

The drive circuit 4 includes an integrated circuit (IC) and the like. The drive circuit 4 compares voltage command values Vu*, Vv*, Vw* output from the calculation unit 5 with a triangle wave, and outputs the drive signals S1 to S6 in response to the comparison results to gate terminals of the switching elements SW1 to SW6, respectively. For example, when an amplitude value of the voltage command value Vu* is equal to or greater than an amplitude value of the triangle wave, the drive circuit 4 outputs the drive signal S1 at a high level and outputs the drive signal S2 at a low level. When the amplitude value of the voltage command value Vu* is smaller than the amplitude value of the triangle wave, the drive circuit 4 outputs the drive signal S1 at a low level and outputs the drive signal S2 at a high level. When an amplitude value of the voltage command value Vv* is equal to or greater than an amplitude value of the triangle wave, the drive circuit 4 outputs the drive signal S3 at a high level and outputs the drive signal S4 at a low level. When an amplitude value of the voltage command value Vv* is smaller than an amplitude value of the triangle wave, the drive circuit 4 outputs the drive signal S3 at a low level and outputs the drive signal S4 at a high level. When the voltage command value Vw* is equal to or greater than an amplitude value of the triangle wave, the drive circuit 4 outputs the drive signal S5 at a high level and outputs the drive signal S6 at a low level. When the voltage command value Vw* is smaller than the amplitude value of the triangle wave, the drive circuit 4 outputs the drive signal S5 at a low level and the drive signal S6 at a high level.

When the amplitude values of the voltage command values Vu*, Vv*, Vw* are smaller than the amplitude value of the triangle wave, the drive circuit 4 may perform a Pulse Width Modulation (PWM) control in which the switching elements SW1 to SW6 are repeatedly turned on and off in one cycle of each of the voltage command values Vu*, Vv*, Vw*.

When the amplitude values of the voltage command values Vu*, Vv*, Vw* are greater than the amplitude value of the triangle wave, the drive circuit 4 may perform an overmodulation control in which the switching elements SW1 to SW6 are repeatedly turned on and off in a part of one cycle of each of the voltage command values Vu*, Vv*, Vw* and are always on or off in the rest of one cycle of each of the voltage command values Vu*, Vv*, Vw*.

Furthermore, when the amplitude values of the voltage command values Vu*, Vv*, Vw* are even greater than the amplitude value of the triangle wave, the drive circuit 4 may perform a square wave control in which the switching elements SW1 to SW6 are always on or off in a half cycle of each of the voltage command values Vu*, Vv*, Vw* and are always on or off in the rest of the half cycle of each of the voltage command values Vu*, Vv*, Vw*.

The calculation unit 5 includes a microcomputer or the like, and includes a speed calculation unit 6, a subtraction unit 7, a torque control unit 8, a torque/current command value conversion unit 9, subtraction units 10 and 11, a current control unit 12, a dq/uvw conversion unit 13, a coordinate conversion unit 14, and an estimation unit 15. For example, the microcomputer executes programs stored in a storage unit, which is not illustrated, to realize the speed calculation unit 6, the subtraction unit 7, the torque control unit 8, the torque/current command value conversion unit 9, the subtraction units 10 and 11, the current control unit 12, the dq/uvw conversion unit 13, the coordinate conversion unit 14, and the estimation unit 15.

The speed calculation unit 6 calculates a rotational speed $\omega$ with use of an estimated position $\hat{\theta}$ of the rotor of the electric motor M estimated by the estimation unit 15. For example, the speed calculation unit 6 calculates the rotational speed $\omega$ by dividing the estimated position $\hat{\theta}$ by a control cycle of the calculation unit 5.

The subtraction unit 7 calculates a difference $\Delta\omega$ between a rotational speed command value $\omega^*$ input externally and the rotational speed $\hat{\omega}$ output from the speed calculation unit 6.

The torque control unit 8 calculates a torque command value T* with use of the difference $\Delta\omega$ output from the subtraction unit 7. For example, the torque control unit 8 calculates a torque corresponding to a rotational speed equivalent to the difference $\Delta\omega$ as the torque command value T* with reference to information, in which the rotational speed of the rotor of the electric motor M and the torque of the electric motor M are associated with each other, stored in the storage unit (not illustrated).

The torque/current command value conversion unit 9 converts the torque command value T* output from the torque control unit 8 to a d-axis current command value Id* and a q-axis current command value Iq*. For example, the torque/current command value conversion unit 9 obtains the d-axis current command value Id* and the q-axis current command value Iq* corresponding to a torque equivalent to the torque command value T* with reference to information, in which the torque of the electric motor M and, the d-axis current command value Id* and the q-axis current command value Iq* are associated with each other, stored in the storage unit (not illustrated).

The subtraction unit 10 calculates a difference $\Delta$Id between the d-axis current command value Id* output from the torque/current command value conversion unit 9 and an estimated d-axis current $\hat{Id}$ output from the estimation unit 15.

The subtraction unit 11 calculates a difference $\Delta$Iq between the q-axis current command value Iq* output from the torque/current command value conversion unit 9 and an estimated q-axis current $\hat{Iq}$ output from the estimation unit 15.

The current control unit 12 calculates a d-axis voltage command value Vd* and a q-axis voltage command value Vq* by Proportional Integral (PI) control in which the difference $\Delta$Id output from the subtraction unit 10 and the difference $\Delta$Iq output from the subtraction unit 11 are used. For example, the current control unit 12 calculates the d-axis voltage command value Vd* with use of Equation 1 below and calculates the q-axis voltage command value Vq* with use of Equation 2 below. A constant of a proportional term of PI control is represented by Kp, a constant of an integral term of PI control is represented by Ki, a q-axis inductance of a coil included in the electric motor M is represented by Lq, a d-axis inductance of the coil included in the electric motor M is represented by Ld, a rotational speed is represented by $\omega$, and an induced voltage constant is represented by Ke.

$$d\text{-axis voltage command value } Vd^* = Kp \times \text{difference } \Delta Id + \int (Ki \times \text{difference } \Delta Id) - \omega Lq Iq \quad \text{Equation 1}$$

$$q\text{-axis voltage command value } Vq^* = Kp \times \text{difference } \Delta Iq + \int (Ki \times \text{difference } \Delta Iq) + \omega Ld Id + \omega Ke \quad \text{Equation 2}$$

The dq/uvw conversion unit 13 converts the d-axis voltage command value Vd* and the q-axis voltage command value Vq* to the U-phase voltage command value Vu*, the V-phase voltage command value Vu*, and the W-phase voltage command value Vw* with use of the estimated position $\hat{\theta}$ output from the estimation unit 15.

The coordinate conversion unit 14 calculates a W-phase current Iw flowing through a W-phase of the electric motor M with use of the U-phase current Iu detected by the current sensor Se1 and a V-phase current Iv detected by the current sensor Se2. The coordinate conversion unit 14 converts the U-phase current Iu, the V-phase current Iv, and the W-phase current Iw to a d-axis current Id (a current component for generating a field weakening) and a q-axis current Iq (a current component for generating a torque) with use of the estimated position θ^ output from the estimation unit 15. The coordinate conversion unit 14 and the current sensors Se1 and Se2 form a current acquisition unit that acquires currents flowing through the electric motor M.

A combination of the currents detected by the current sensors Se1 and Se2 is not limited to a combination of the U-phase current Iu and the V-phase current Iv, but may be a combination of the V-phase current Iv and the W-phase current Iw, or a combination of the U-phase current Iu and the W-phase current Iw. When the current sensors Se1 and Se2 detect the V-phase current Iv and the W-phase current Iw, the coordinate conversion unit 14 calculates the U-phase current Iu with use of the V-phase current Iv and the W-phase current Iw. When the current sensors Se1 and Se2 detect the U-phase current Iu and the W-phase current Iw, the coordinate conversion unit 14 calculates the V-phase current Iv with use of the U-phase current Iu and the W-phase current Iw.

When the inverter circuit 2 further includes, in addition to the current sensors Se1 and Se2, a current sensor Se3 that detects a current flowing through the W-phase of the electric motor M, the coordinate conversion unit 14 may be configured to convert the U-phase current Iu, the V-phase current Iv, and the W-phase current Iw that are detected by the current sensors Se1 to Se3 to the d-axis current Id and the q-axis current Iq with use of the estimated position θ^ output from the estimation unit 15. In this case, the coordinate conversion unit 14 and the current sensors Se1 to Se3 form a current acquisition unit that acquires the currents flowing through the electric motor M.

When the inverter circuit 2 includes, instead of the current sensors Se1 and Se2, one shunt resistance connected to the emitter terminal of each of the switching elements SW2, SW4, and SW6, the coordinate conversion unit 14 may calculate the U-phase current Iu, the V-phase current Iv, and the W-phase current Iw with use of timings at which each of the switching elements SW1 to SW6 is turned on or off, a voltage applied to the shunt resistance, and a resistance value of the shunt resistance, and may convert the U-phase current Iu, the V-phase current Iv, and the W-phase current Iw to the d-axis current Id and the q-axis current Iq with use of the estimated position θ^ output from the estimation unit 15. In this case, the coordinate conversion unit 14 and the shunt resistance form a current acquisition unit that acquires the currents flowing through the electric motor M.

The coordinate conversion unit 14 may calculate all of the U-phase current Iu, the V-phase current Iv, and the W-phase current Iw in one cycle of each of the voltage command values Vu*, Vv*, Vw* during the PWM control performed by the drive circuit 4, and may output the d-axis current Id and the q-axis current Iq.

The coordinate conversion unit 14 cannot calculate the U-phase current Iu, the V-phase current Iv, and the W-phase current Iw in a part of one cycle of each of the voltage command values Vu*, Vv*, Vw* during the overmodulation control or the square wave control performed by the drive circuit 4, and cannot output the d-axis current Id and the q-axis current Iq.

During the square wave control performed by the drive circuit 4, the coordinate conversion unit 14 cannot calculate all of the U-phase current Iu, the V-phase current Iv, and the W-phase current Iw in one cycle of each of the voltage command values Vu*, Vv*, Vw and cannot output the d-axis current Id and the q-axis current Iq.

The control circuit 3 controls an operation of the inverter circuit 2 on the basis of the voltage command values corresponding to the difference between the current command values calculated on the basis of a position of the rotor of the electric motor M and the currents flowing through the electric motor M. In order to exert the above-described function, the control circuit 3 has the estimation unit 15.

The estimation unit 15 outputs the estimated d-axis current Id^, the estimated q-axis current Iq^, and the estimated position θ^ with use of the rotational speed ω output from the speed calculation unit 6, the d-axis voltage command value Vd* and the q-axis voltage command value Vq* output from the current control unit 12, and the d-axis current Id and the q-axis current Iq output from the coordinate conversion unit 14.

Figure 2:
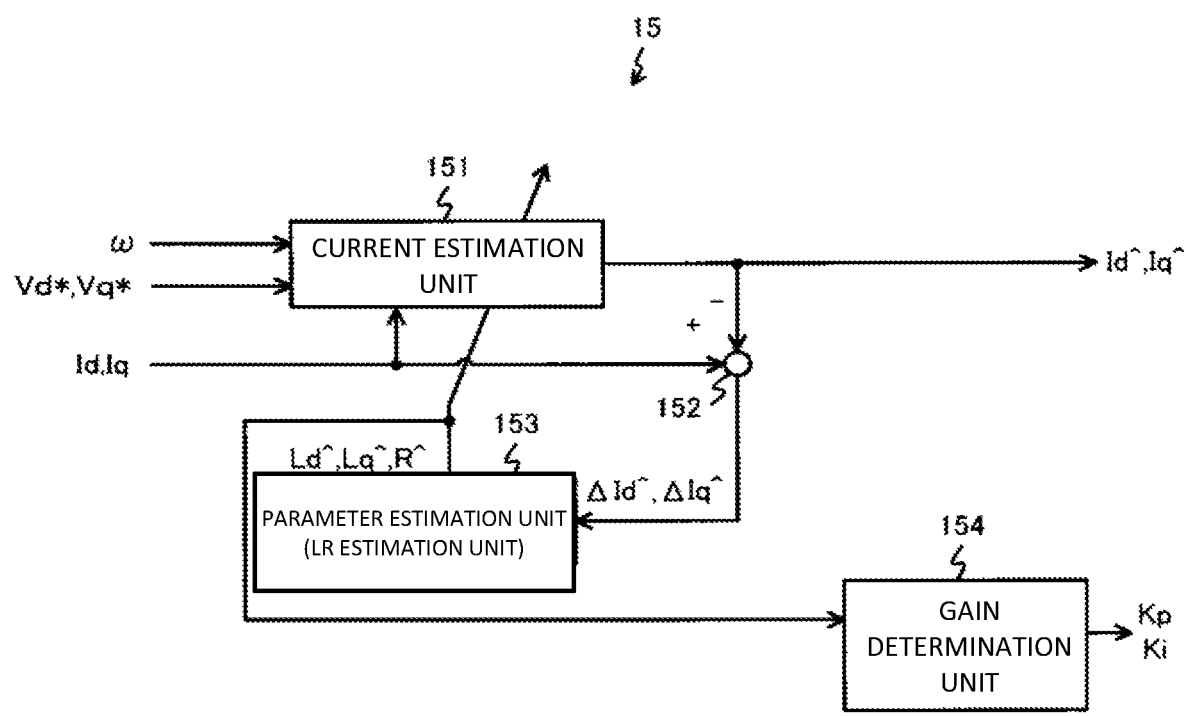
FIG. 2 is a diagram illustrating an example of an estimation unit.

FIG. 2 is a diagram illustrating an example of the estimation unit 15.

The estimation unit 15 illustrated in FIG. 2 includes a current estimation unit 151, a subtraction unit 152, a parameter estimation unit (the LR estimation unit) 153, and a gain determination unit 154.

When the coordinate conversion unit 14 outputs the d-axis current Id and the q-axis current Iq (when the current acquisition unit acquires the currents flowing through the electric motor M), the current estimation unit 151 outputs the d-axis current Id as the estimated d-axis current Id^ to the subtraction unit 10 and outputs the q-axis current Iq as the estimated q-axis current Iq^ to the subtraction unit 11.

When the coordinate conversion unit 14 does not output the d-axis current Id and the q-axis current Iq (when the current acquisition unit does not acquire the currents flowing through the electric motor M), the current estimation unit 151 calculates the estimated d-axis current Id^ and the estimated q-axis current Iq^ with use of the d-axis voltage command value Vd* and the q-axis voltage command value Vq* output from the current control unit 12, a parameter unique to the electric motor M estimated by the parameter estimation unit 152, and the rotational speed ω output from the speed calculation unit 6, and outputs the estimated d-axis current Id^ and the estimated q-axis current Iq^ having been calculated, to the subtraction units 10 and 11.

When the coordinate conversion unit 14 does not output the d-axis current Id and the q-axis current Iq, for example, the current estimation unit 151 substitutes the d-axis voltage command value Vd* and the q-axis voltage command value Vq* for Vd and Vq into Equation 3 below, substitutes R, Ld, and Lq corresponding to parameters unique to the electric motor M for Equation 3 below, substitutes the rotational speed ω into Equation 3 below so that Id and Iq are calculated, and outputs the calculated Id and Iq as the estimated d-axis current Id^ and the estimated q-axis current Iq^ to the subtraction units 10 and 11. In Equation 3 below that is a voltage equation as a model of the electric motor M, the resistance of the coil of the electric motor M is represented by R, the d-axis inductance of the coil of the electric motor M is represented by Ld, the q-axis inductance of the coil of the electric motor M is represented by Lq, and a differential operator is represented by P, and the induced voltage constant is represented by Ke.

[Math. 1]

$$\begin{pmatrix} Vd \\ Vq \end{pmatrix} = \begin{pmatrix} R + PLd & -\omega Ld \\ \omega Ld & R + PLq \end{pmatrix} \begin{pmatrix} Id \\ Iq \end{pmatrix} + \begin{pmatrix} 0 \\ \omega Ke \end{pmatrix} \qquad \text{Equation 3}$$

When the coordinate conversion unit 14 outputs the d-axis current Id and the q-axis current Iq (when the current acquisition unit acquires the currents flowing through the electric motor M), the subtraction unit 152 calculates a difference ΔId^ (first difference) between the d-axis current Id output from the coordinate conversion unit 14 and the estimated d-axis current Id^ output from the current estimation unit 151, and calculates a difference ΔIq^ (first difference) between the q-axis current Iq output from the coordinate conversion unit 14 and the estimated q-axis current Iq^ output from the current estimation unit 151.

When the subtraction unit 152 outputs the differences ΔId^, ΔIq^ (when the current acquisition unit acquires the currents flowing through the electric motor M), the parameter estimation unit 153 estimates the parameters (the resistance R, the d-axis inductance Ld, and the q-axis inductance Lq) unique to the electric motor M.

Specifically, the parameter estimation unit 153 corresponding to the LR estimation unit estimates the inductances (the d-axis inductance Ld and the q-axis inductance Lq) and the resistance R corresponding to the parameters unique to the electric motor M, and identifies the parameters (a d-axis inductance Ld^, a q-axis inductance Lq^, and a resistance R^), on the basis of the differences (ΔId^, ΔIq^) between the currents (the d-axis current Id, the q-axis current Iq) acquired by the coordinate conversion unit (the current acquisition unit) 14 and the currents (the estimated d-axis current Id^, the estimated q-axis current Iq^) estimated by the current estimation unit 151.

That is, when the subtraction unit 152 outputs the differences ΔId^, ΔIq^, the parameter estimation unit 153 repeatedly estimates the parameters so that the differences ΔId^, ΔIq^ become zero, for every time a control is performed. When the parameter estimation unit 153 repeatedly estimates the parameters, the differences ΔId^, ΔIq^ gradually approach zero. After a predetermined time or more passes from the start of the estimation of the parameters, the differences ΔId^, ΔIq^ become zero to identify the parameters (the d-axis inductance Ld^, the q-axis inductance Lq^, the resistance R^) estimated by the parameter estimation unit 153.

The parameter estimation unit 153 may estimate the resistance R, the d-axis inductance Ld, and the q-axis inductance Lq using a recursive least squares method with use of Equations 4 to 7 below, for example. Equation 8 below corresponds to $y_N$. When $\theta^T$ and $Z_N^T$ are defined as represented in Equations 9 and 10 below, Equation 8 below is represented as in Equation 11 below. Output values (the differences ΔId^, ΔIq^) of the subtraction unit 152 are represented by $r_N$, the parameters (the resistance R, the d-axis inductance Ld, and the q-axis inductance Lq) unique to the electric motor M are represented by $a_i$ and $b_i$, output values (the d-axis current Id and the q-axis current Iq) of the coordinate conversion unit 14 are represented by $y_{N-i}$, output values (the d-axis voltage command value Vd* and the q-axis voltage command value Vq*) of the current control unit 12 are represented by $u_{N-i}$. $\varphi_N$ and $\psi_N$ correspond to $Z_N$, and forgetting factors are represented by $\rho_N$.

[Math. 2]
$$\hat{\theta}_N = \hat{\theta}_{N-1} + L_N \varepsilon_N \quad \text{Equation 4}$$

[Math. 3]
$$\varepsilon_N = y_N - \phi_N^T \hat{\theta}_{N-1} \quad \text{Equation 5}$$

[Math. 4]
$$L_N = \frac{P_{N-1}\phi_N}{\rho_N + \phi_N^T P_{N-1}\phi_N} \quad \text{Equation 6}$$

[Math. 5]
$$P_N = \frac{1}{\rho_N}\left[P_{N-1} - \frac{P_{N-1}\phi_N\phi_N^T P_{N-1}}{\rho_N + \phi_N^T P_{N-1}\phi_N}\right] \quad \text{Equation 7}$$

[Math. 6]
$$y_N = -\sum_{i=1}^{n} a_i y_{N-i} + \sum_{i=1}^{n} b_i u_{N-i} + r_N \quad \text{Equation 8}$$

[Math. 7]
$$\theta^T = [a_1, \ldots, a_n, b_1, \ldots, b_n] \quad \text{Equation 9}$$

[Math. 8]
$$Z_N^T = [-y_{N-1}, \ldots, -y_{N-n}, u_{N-1}, \ldots, u_{N-n}] \quad \text{Equation 10}$$

[Math. 9]
$$y_N = Z_N^T \theta + r_N \quad \text{Equation 11}$$

The gain determination unit 154 determines a proportional gain Kp for a current control on the basis of estimated inductances (the d-axis inductance Ld^, the q-axis inductance Lq^) of the electric motor M estimated by the parameter estimation unit 153 serving as the LR estimation unit. As described above, the proportional gain Kp is represented as the constant of the proportional term of PI control, in Equation 12 below. Since a cut-off angular frequency ωc is a predetermined value, the estimated inductances (the d-axis inductance Ld^, the q-axis inductance Lq^) of the electric motor M estimated by the parameter estimation unit 153 serving as the LR estimation unit into Equation 12 below.

$$Kp = \omega c \times L(\omega c \text{ corresponding to the cut-off angular frequency}) \quad \text{Equation 12}$$

The gain determination unit 154 determines an integration gain Ki for the current control on the basis of the estimated resistance (the resistance R^) of the electric motor M estimated by the parameter estimation unit 153 serving as the LR estimation unit. As described above, the integration gain Ki is represented as the constant of the integral term of PI control, in Equation 13 below. Since the cut-off angular frequency ωc is a predetermined value, the integration gain Ki is determined by substituting the estimated resistance (the resistance R^) of the electric motor M estimated by the parameter estimation unit 153 serving as the LR estimation unit into Equation 13 below.

$$Ki = \omega c \times R(\omega c \text{ corresponding to the cut-off angular frequency}) \quad \text{Equation 13}$$

An output current of the voltage equation (normative model), that is, the current of the electric motor M as a control target is divided into the d-axis and the q-axis and obtained as Id and Iq. Therefore, calculations using the recursive least squares method and a weighted least squares method which will be described later are performed separately for the d-axis and the q-axis, and the inductances are divided into the d-axis and the q-axis and obtained as Ld and Lq. Ld, Lq, and R are used for calculating the gain, Ld and Lq may be used as they are. However, Rd and Rq need to be converted to three-phase stator resistances since Rd and Rq cannot be used as they are. For this conversion, Equation 14 below may be applied, for example.

[Math. 10]

$$\begin{pmatrix} Rd \\ Rq \end{pmatrix} = \begin{pmatrix} \cos\theta d & \sin\theta d \\ -\sin\theta d & \cos\theta d \end{pmatrix} \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} Ru \\ Rv \\ Rw \end{pmatrix} \quad \text{Equation 14}$$

The estimation unit 15 may include a position estimation unit (not illustrated) configured to estimate a position of the rotor of the electric motor M by substituting a voltage command value, a current estimated by a current estimation unit, a parameter estimated by a parameter estimation unit, and a rotational speed into a voltage equation defined as a model of the electric motor M. The position estimation unit may be configured to calculate the estimated position θ^ of the rotor of the electric motor M with use of the d-axis voltage command value Vd* and the q-axis voltage command value Vq* output from the current control unit 12, the d-axis current Id and the q-axis current Iq output from the coordinate conversion unit 14 or the estimated d-axis current Id^ and the estimated q-axis current Iq^ output from the current estimation unit 151, the parameter output from the parameter estimation unit 153, and the rotational speed ω output from the speed calculation unit 6.

Figure 3:
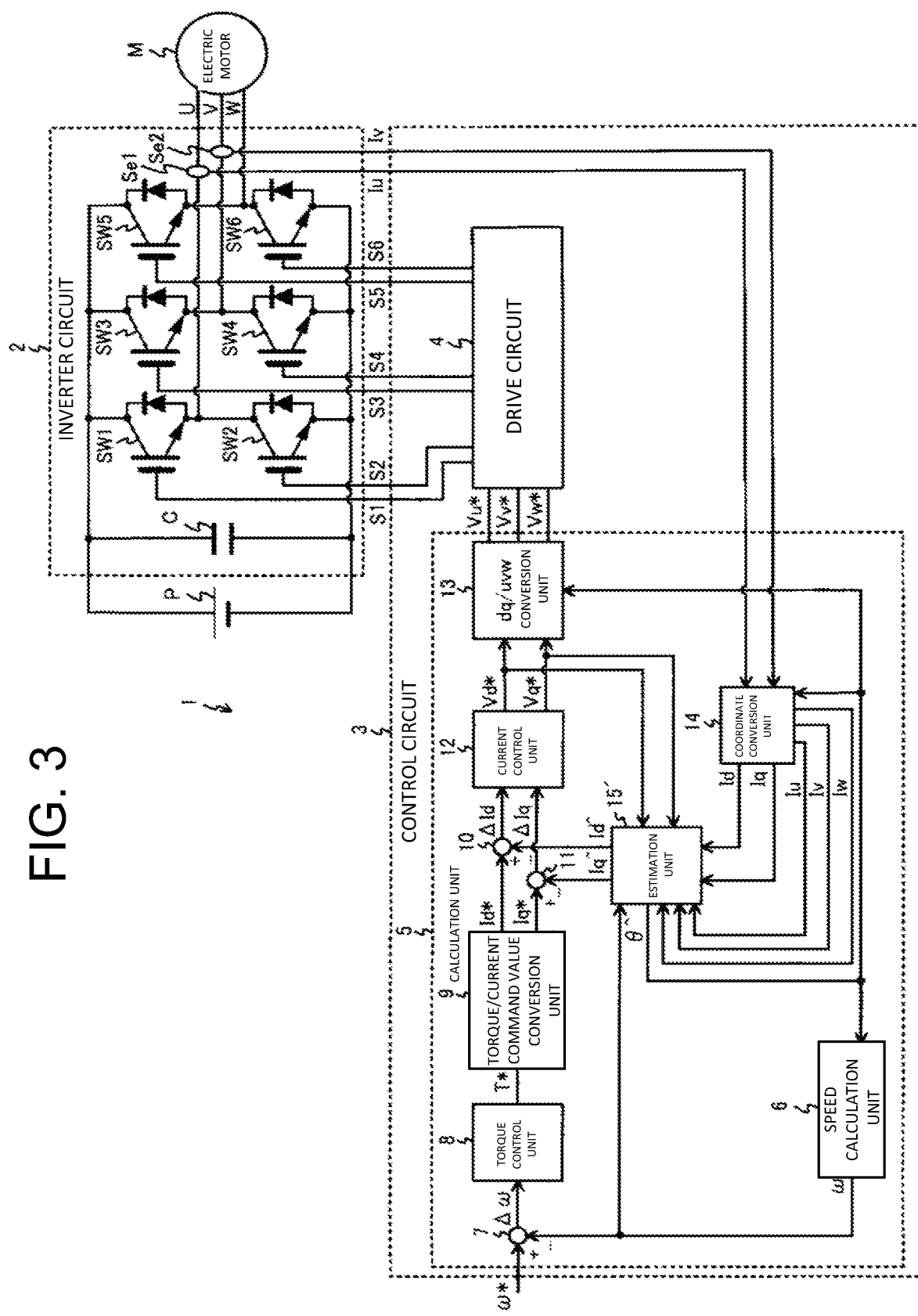
FIG. 3 is a diagram illustrating another example of the control device for the electric motor of the embodiment.

FIG. 3 is a diagram illustrating another example of the control device of the electric motor of the embodiment. In a control device 1' of the electric motor M illustrated in FIG. 3, the same or equivalent parts as in FIG. 1 are designated by the same signs, and the redundant descriptions thereof are omitted.

In the control device 1" of the electric motor M illustrated in FIG. 3, an estimation unit 15' uses the U-phase current Iu, the V-phase current Iv, and the W-phase current Iw output from the coordinate conversion unit 14 to determine whether the estimated d-axis current Id^ and the estimated q-axis current Iq^ are incorrect, and this feature of the control device 1" is different from the control device 1 of the electric motor M illustrated in FIG. 1.

Figure 4:
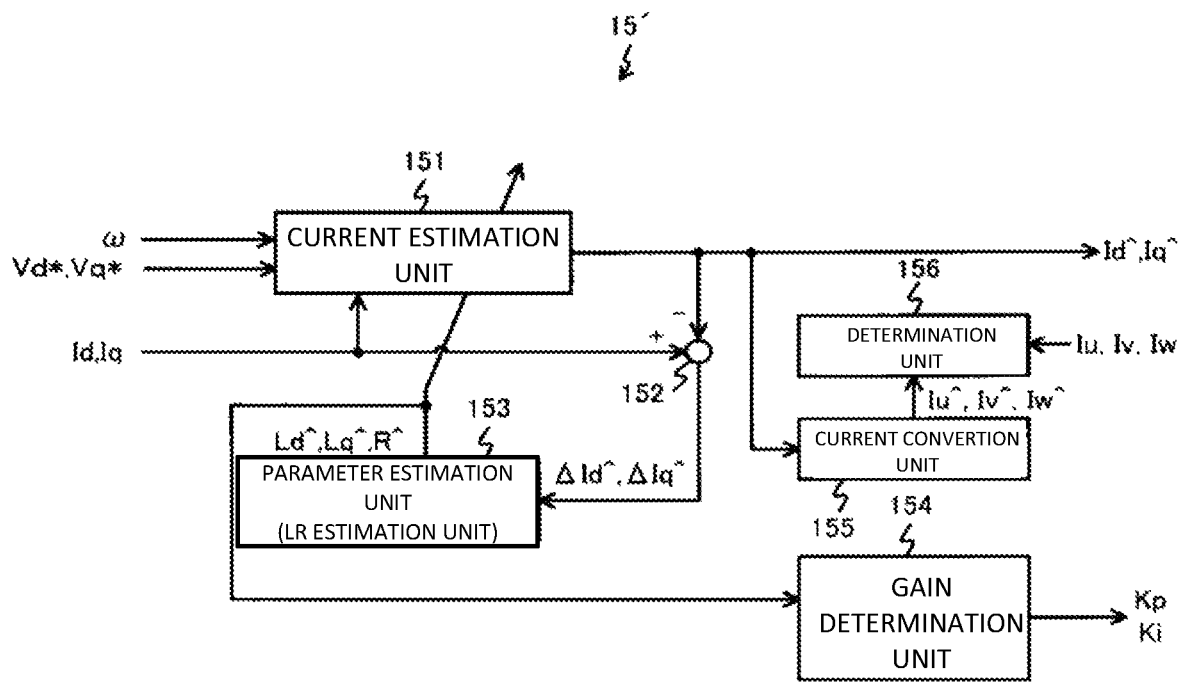
FIG. 4 is a diagram illustrating another example of an estimation unit.

FIG. 4 is a diagram illustrating an example of the estimation unit 15". In the estimation unit 15" illustrated in FIG. 4, the same or equivalent parts as in FIG. 2 are designated by the same signs, and the redundant descriptions thereof are omitted.

The estimation unit 15' illustrated in FIG. 4 differs from the estimation unit 15 illustrated in FIG. 2 in that the estimation unit 15' further includes a current conversion unit 155 and a determination unit 156.

The current conversion unit 155 converts the estimated d-axis current Id^ and the estimated q-axis current Iq^ to an estimated U-phase current Iu^, an estimated V-phase current Iv^, and an estimated W-phase current Iw^ with use of the estimated position θ^, for example. The current conversion unit 155 converts the estimated d-axis current Id^ and the estimated q-axis current Iq^ to the estimated U-phase current Iu^, the estimated V-phase current Iv^, and the estimated W-phase current Iw^ with use of a transformation matrix C represented in Equation 15 below, for example.

[Math. 11]

$$C = \sqrt{\frac{2}{3}} \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{bmatrix} \quad \text{Equation 15}$$

The determination unit 156 calculates a difference ΔIu (second difference) between the U-phase current Iu output from the coordinate conversion unit 14 and the estimated U-phase current Iu^ output from the current conversion unit 155, calculates a difference ΔIv (second difference) between the V-phase current Iv output from the coordinate conversion unit 14 and the estimated V-phase current Iv^ output from the current conversion unit 155, and calculates a difference ΔIw (second difference) between the W-phase current Iw output from the coordinate conversion unit 14 and the estimated W-phase current Iw^ output from the current conversion unit 155. When the difference ΔIu is equal to or greater than a threshold Iuth, the determination unit 156 determines that the estimated U-phase current Iu^ is incorrect (the estimated U-phase current Iu^ is different from a current flowing through the U-phase of the electric motor M). When the difference ΔIu is smaller than the threshold Iuth, the determination unit 156 determines that the estimated U-phase current Iu^ is correct (the estimated U-phase current Iu^ matches or substantially matches the current flowing through the U-phase of the electric motor M). When the difference ΔIv is equal to or greater than a threshold Ivth, the determination unit 156 determines that the estimated V-phase current Iv^ is incorrect (the estimated V-phase current Iv^ is different from a current flowing through the V-phase of the electric motor M). When the difference ΔIv is smaller than the threshold Ivth, the determination unit 156 determines that the estimated V-phase current Iv^ is correct (the estimated V-phase current Iv^ matches or substantially matches the current flowing through the V-phase of the electric motor M). When the difference ΔIw is equal to or greater than a threshold Iwth, the determination unit 156 determines that the estimated W-phase current Iw^ is incorrect (the estimated W-phase current Iw^ is different from a current flowing through the W-phase of the electric motor M). When the difference ΔIw is smaller than the threshold Iwth, the determination unit 156 determines that the estimated W-phase current Iw^ is correct (the estimated W-phase current Iw^ matches or substantially matches the current flowing through the W-phase of the electric motor M).

When it is determined that at least one of the estimated U-phase current Iu^, the estimated V-phase current Iv^, and the estimated W-phase current Iw^ that are estimated at the present control timing is incorrect, the current estimation unit 151 may be configured to output an estimated d-axis current Id^ and an estimated q-axis current Iq^ that have been determined to be correct to the subtraction units 10, 11, out of the estimated d-axis currents Id^ and estimated q-axis currents Iq^ estimated at previous control timings, without outputting the estimated d-axis current Id^ and the estimated q-axis current Iq^ estimated at the present control timing.

Furthermore, when the determination unit 156 determines that current estimation by the current estimation unit 151 is incorrect, the parameter estimation unit 153 may stop estimations of the inductance and the resistance of the electric motor M and the gain determination unit 154 may stop gain determination based on the estimated inductance and the estimated resistance. Then, the current estimation by the current estimation unit 151, the estimation of the inductance and the resistance of the electric motor M by the parameter estimation unit 153, and the gain determination by the gain determination unit 154 may be retried.

In the above-described example, a case in which the inductance and the resistance of the electric motor M are estimated using the recursive least squares method is explained as an example. Alternatively, the inductance and the resistance of the electric motor M may be estimated using the weighted least squares method. The parameter identification using the weighted least squares method is performed by applying small weighting to old data. A discrete-time system of a control target for the parameter identification is given by Equation 16 below in which a current time is represented by k.

[Math. 12]

$$y_k = \theta^T z_k \ (k \geq n)$$

$$y_k = -a_1 y_{k-1} - a_2 y_{k-2} \ldots -a_n y_{k-n} + b_1 u_{k-1} + b_1 u_{k-2} \ldots + b_n u_{k-n} \text{(Component Representation)} \quad \text{Equation 16}$$

Where, $y_i$: Output (Scalar) i=0, 1, 2, . . . .
$u_i$: input (Scalar) 0, 1, 2, . . . .

$$\theta = [a_1, a_2, \ldots, a_n, b_1, b_2, \ldots, b_n]^T (2n \times 1)$$

$$z_k = [-y_{k-1}, -y_{k-2}, \ldots, -y_{k-n}, u_{k-1}, u_{k-2}, \ldots, u_{k-n}]^T (2n \times 1)$$

Control targets, yi, ui (i=0, 1, 2, . . . , k) in Equation 16 are measured and a parameter θ (here, L, R) is identified. That is, minimization (to be zero) of a difference between a current acquired by the current acquisition unit and an estimated current estimated by the current estimation unit is synonymous with calculation of the parameter θ, and the calculation of the parameter θ is synonymous with calculation of L, R. An estimated parameter in Equation 16 is rewritten as Equation 17 below. The parameter θ is determined so as to minimize a sum of errors represented in Equation 18 below that are weighted and squared, and to which i=n to i=k are applied.

[Math. 13]

$$\hat{y}_k = \hat{\theta}^T z_k \quad \text{Equation 17}$$

[Math. 14]

$$y_i - \hat{y}_i = y_i - \hat{\theta}^T z_i \quad \text{Equation 18}$$

When Equation 19 below is considered as an evaluation function, algorithms represented in Equations 20 and 21 below are obtained.

[Math. 15]

$$J(\hat{\theta}) = \sum_{i=n}^{k} \lambda^{k-i} \left( y_i - \hat{\theta}^T z_i \right)^2 \quad \text{Equation 19}$$

Where, $0 < \lambda \leq 1$

[Math. 16]

$$\hat{\theta}_k = \hat{\theta}_{k-1} + \frac{P_{k-1} z_k}{\lambda + z_k^T P_{k-1} z_k} \left( y_k - \hat{\theta}_{k-1}^T z_k \right) \quad \text{Equation 20}$$

$$P_k = \frac{1}{\lambda} \left[ P_{k-1} - \frac{P_{k-1} z_k z_k^T P_{k-1}}{\lambda + z_k^T P_{k-1} z_k} \right] (2n \times 2n) \quad \text{Equation 21}$$

Figure 5:
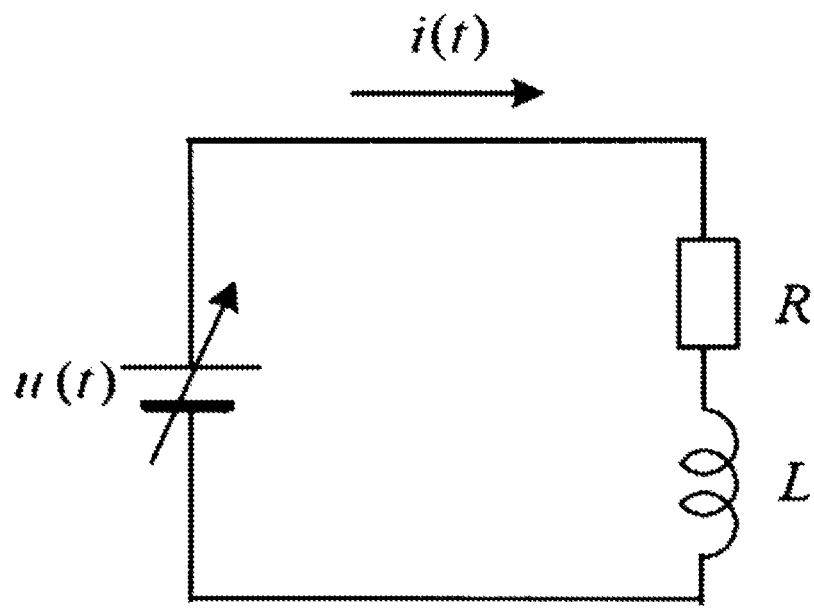
FIG. 5 is a diagram illustrating one example of a control block diagram for performing LR estimation using a weighted least squares method.

FIG. 5 is a diagram illustrating an example of a control block diagram for performing an LR estimation using the weighted least squares method. In a control target of FIG. 5, when i(t) and u(t) are known, L and R may be estimated using the weighted least squares method with use of an adaption mechanism.

In FIG. 5, when Equation 22 below holds and the Euler method is used with a sampling cycle represented by T, a difference equation corresponding to Equation 23 below is obtained and the obtained equation is set as Equation 24 below.

[Math. 17]

$$\frac{di}{dt} = -\frac{R}{L} i + \frac{1}{L} u \quad \text{Equation 22}$$

[Math. 18]

$$\frac{i_k - i_{k-1}}{T} = -\frac{R}{L} i_{k-1} + \frac{1}{L} u_{k-1} \therefore i_k = \left( 1 - \frac{TR}{L} \right) i_{k-1} + \frac{T}{L} u_{k-1} \quad \text{Equation 23}$$

[Math. 19]

$$i_k = a i_{k-1} + b u_{k-1} \ k = 1, 2, \ldots \quad \text{Equation 24}$$

a=1−TR/L, b=T/L are applied, and values of a resistance and an inductance are sequentially updated. Since R and L can be obtained if a and b are calculated, a and b are calculated as follows. Equation 24 is rewritten as Equation 25 below. When Equation 26 below is defined, Equation 20 is rewritten as Equation 27 below. Similarly, Equation 21 may be rewritten.

[Math. 20]

$$i_k = a i_{k-1} + b u_{k-1} \equiv \theta^T z_k \ (k \geq n = 1) \quad \text{Equation 25}$$

$$\theta = \begin{bmatrix} a \\ b \end{bmatrix}, z_k = \begin{bmatrix} i_{k-1} \\ u_{k-1} \end{bmatrix}$$

[Math. 21]

$$P_k = \begin{bmatrix} \alpha_k & \beta_k \\ \beta_k & \gamma_k \end{bmatrix} \quad \text{Equation 26}$$

[Math. 22]

$$\begin{bmatrix} a_k \\ b_k \end{bmatrix} = \begin{bmatrix} a_{k-1} \\ b_{k-1} \end{bmatrix} + \frac{1}{\lambda + z^T(k) P(k-1) z(k)} \begin{bmatrix} \alpha_{k-1} i_{k-1} + \beta_{k-1} u_{k-1} \\ \beta_{k-1} i_{k-1} + \gamma_{k-1} u_{k-1} \end{bmatrix} \quad \text{Equation 27}$$

$$(i_k - a_{k-1} i_{k-1} - b_{k-1} u_{k-1})$$

A control method for the electric motor M by the control device 1, 1' of the electric motor M of the above embodiment is achieved by various processing steps executed by functional components of a computer included in the estimation unit 15, 15'. Specifically, the current estimation unit 151 executes a current estimation step in which a current flowing through an electric motor is estimated by substituting a voltage command value, a parameter unique to the electric motor, and a rotational speed obtained on the basis of a position of a rotor of the electric motor, into a voltage equation as a model of the electric motor. The parameter estimation unit (the LR estimation unit) 153 executes an LR estimation step in which an inductance and a resistance of the electric motor that are the parameters are estimated on the basis of a difference between the current acquired by a current acquisition unit and a current estimated in the current estimation step of the current estimation unit 151. The gain determination unit 154 executes a gain determination step in which a proportional gain for a current control is determined on the basis of an estimated inductance of the electric motor and an integration gain for the current control is determined on the basis of an estimated resistance of the electric motor. The determination unit 156 executes a determination step in which a current estimated in the current estimation step of the current estimation unit 151 is determined to be incorrect, when a difference between a current acquired by the current acquisition unit and a current estimated in the current estimation step of the current estimation unit 151 is equal to or greater than a threshold. In the LR estimation step of the parameter estimation unit (the LR estimation unit) 153, the inductance and the resistance of the electric motor are estimated using the recursive least squares method or the weighted least squares method. When the determination unit 156 determines that, in the determination step, the current estimated in the current estimation step of the current estimation unit 151 is incorrect, estimations of the inductance and the resistance are stopped in the LR estimation step of the parameter estimation unit (the LR estimation unit) 153, and determinations of the proportional gain and the integration gain based on the estimated inductance and the estimated resistance is stopped in the gain determination step of the gain determination unit 154.

Thus, in the control device 1, 1' of the electric motor M of the above embodiment, the parameter estimation unit 153 serving as the LR estimation unit estimates the inductances (the d-axis inductance Ld, a q-axis inductance Lq) and the resistance R that are parameters (the d-axis inductance Ld^, the q-axis inductance Lq^, the resistance R^) unique to the electric motor M, on the basis of the differences (ΔId^, ΔIq^) between currents (the d-axis current Id, the q-axis current Iq) acquired by the coordinate conversion unit (the current acquisition unit) 14 and currents (the estimated d-axis current Id^, the estimated q-axis current Iq^) estimated by the current estimation unit 151. The gain determination unit 154 determines the proportional gain Kp for the current control on the basis of estimated inductances (the d-axis inductance Ld^, the q-axis inductance Lq^) of the electric motor M estimated by the parameter estimation unit 153 serving as the LR estimation unit and determines an integration gain Ki for the current control on the basis of an estimated resistance (the resistance R^) of the electric motor M estimated by the parameter estimation unit 153 serving as the LR estimation unit.

Accordingly, a voltage equation as a model of the electric motor is used to estimate online the estimated inductances (the d-axis inductance Ld^, the q-axis inductance Lq^) and the estimated resistance (the resistance R^) of the electric motor with high accuracy and to determine the proportional gain Kp and the integration gain Ki for the current control with high accuracy on the basis of the estimated inductances and the estimated resistance of the electric motor.

Therefore, a simple and suitable current control may be achieved.

In the present disclosure, the LR estimation unit may estimate the inductance and the resistance with high accuracy using the recursive least squares method or the weighted least squares method.

In the present disclosure, the determination step executed by the determination unit prevents an incorrect estimated current from being used, which can prevent an error in estimation of the inductances and the resistance of the electric motor and an error in determination of the proportional gain and the integration gain in advance.

In the present disclosure, estimation of an incorrect (low reliability) inductance and an incorrect (low reliability) resistance based on an incorrect (low reliability) estimated current and determination of an incorrect (low reliability) proportional gain and an incorrect (low reliability) integration gain can be reliably prevented.

The present disclosure is not limited to the above-described embodiments, and various improvements and changes may be made without departing from the gist of the present disclosure.

REFERENCE SIGNS LIST 1, 1' control device
2 inverter circuit
3 control circuit
4 drive circuit
5 calculation unit
6 speed calculation unit
7 subtraction unit
8 torque control unit
9 torque/current command value conversion unit
10 subtraction unit
11 subtraction unit
12 current control unit
13 dq/uvw conversion unit
14 coordinate conversion unit (current acquisition unit)
15, 15' estimation unit
151 current estimation unit
152 subtraction unit
153 parameter estimation unit (LR estimation unit)
154 gain determination unit
155 current conversion unit
156 determination unit
M electric motor
Se1, Se2 current sensor (current acquisition unit)

The invention claimed is:

1. A control device for an electric motor, the control device comprising:
   an inverter circuit that drives a rotor of the electric motor;
   a current acquisition unit configured to acquire a current flowing through the electric motor; and
   a control circuit that controls an operation of the inverter circuit on a basis of a voltage command value corresponding to a difference between a current command value calculated on the basis of a position of the rotor of the electric motor and the current flowing through the electric motor, wherein
   the control circuit includes:
      a current estimation unit configured to estimate the current flowing through the electric motor by substituting the voltage command value, a parameter unique to the electric motor, and a rotational speed calculated on the basis of the position of the rotor of the electric motor into a voltage equation as a model of the electric motor;
      an LR estimation unit configured to estimate an inductance and a resistance of the electric motor on the basis of a difference between the current acquired by the current acquisition unit and an estimated current by the current estimation unit, each of the inductance and the resistance of the electric motor corresponding to the parameter; and
      a gain determination unit configured to determine a proportional gain for a current control on the basis of an estimated inductance of the electric motor and determine an integration gain for the current control on the basis of an estimated resistance of the electric motor.

2. The control device for the electric motor according to claim 1, wherein
   the LR estimation unit estimates the inductance and the resistance of the electric motor using a recursive least squares method or a weighted least squares method.

3. The control device for the electric motor according to claim 1, wherein
   the control circuit includes a determination unit configured to determine that the estimated current by the current estimation unit is incorrect when a difference between the current acquired by the current acquisition unit and the estimated current by the current estimation unit is equal to or greater than a threshold.

4. The control device for the electric motor according to claim 3, wherein
when the determination unit determines that the estimated current by the current estimation unit is incorrect, the LR estimation unit stops estimations of the inductance and the resistance, and the gain determination unit stops determinations of the proportional gain and the integration gain based on the estimated inductance and the estimated resistance.

5. A control method for an electric motor, the electric motor including:
an inverter circuit that drives a rotor of the electric motor;
a current acquisition unit configured to acquire a current flowing through the electric motor; and
a control circuit that controls an operation of the inverter circuit on a basis of a voltage command value corresponding to a difference between a current command value calculated on the basis of a position of the rotor of the electric motor and the current flowing through the electric motor, wherein
the control circuit executes:
a current estimation step in which the current flowing through the electric motor is estimated by substituting the voltage command value, a parameter unique to the electric motor, and a rotational speed calculated on the basis of the position of the rotor of the electric motor into a voltage equation as a model of the electric motor;
an LR estimation step in which an inductance and a resistance of the electric motor are estimated on the basis of a difference between the current acquired by the current acquisition unit and an estimated current by the current estimation step, each of the inductance and the resistance corresponding to the parameter; and
a gain determination step in which a proportional gain for a current control is determined on the basis of an estimated inductance of the electric motor, and an integration gain for the current control is determined on the basis of an estimated resistance of the electric motor.

6. The control method for the electric motor according to claim 5, wherein
in the LR estimation step, the inductance and the resistance of the electric motor are estimated using a recursive least squares method or a weighted least squares method.

7. The control method for the electric motor according to claim 5, wherein
the control circuit includes a determination step in which the estimated current in the current estimation step is determined to be incorrect when a difference between the current acquired in the current acquisition step and the estimated current in the current estimation step is equal to or greater than a threshold.

8. The control method for the electric motor according to claim 7, wherein
in the determination step, when the estimated current in the current estimation step is determined to be incorrect, estimations of the inductance and the resistance are stopped in the LR estimation step, and determinations of the proportional gain and the integration gain based on the estimated inductance and the estimated resistance are stopped in the gain determination step.

* * * * *